Nov. 14, 1933.  A. H. KING  1,935,186
INTAKE SYSTEM FOR AIRCRAFT ENGINES
Filed July 3, 1930   3 Sheets-Sheet 1
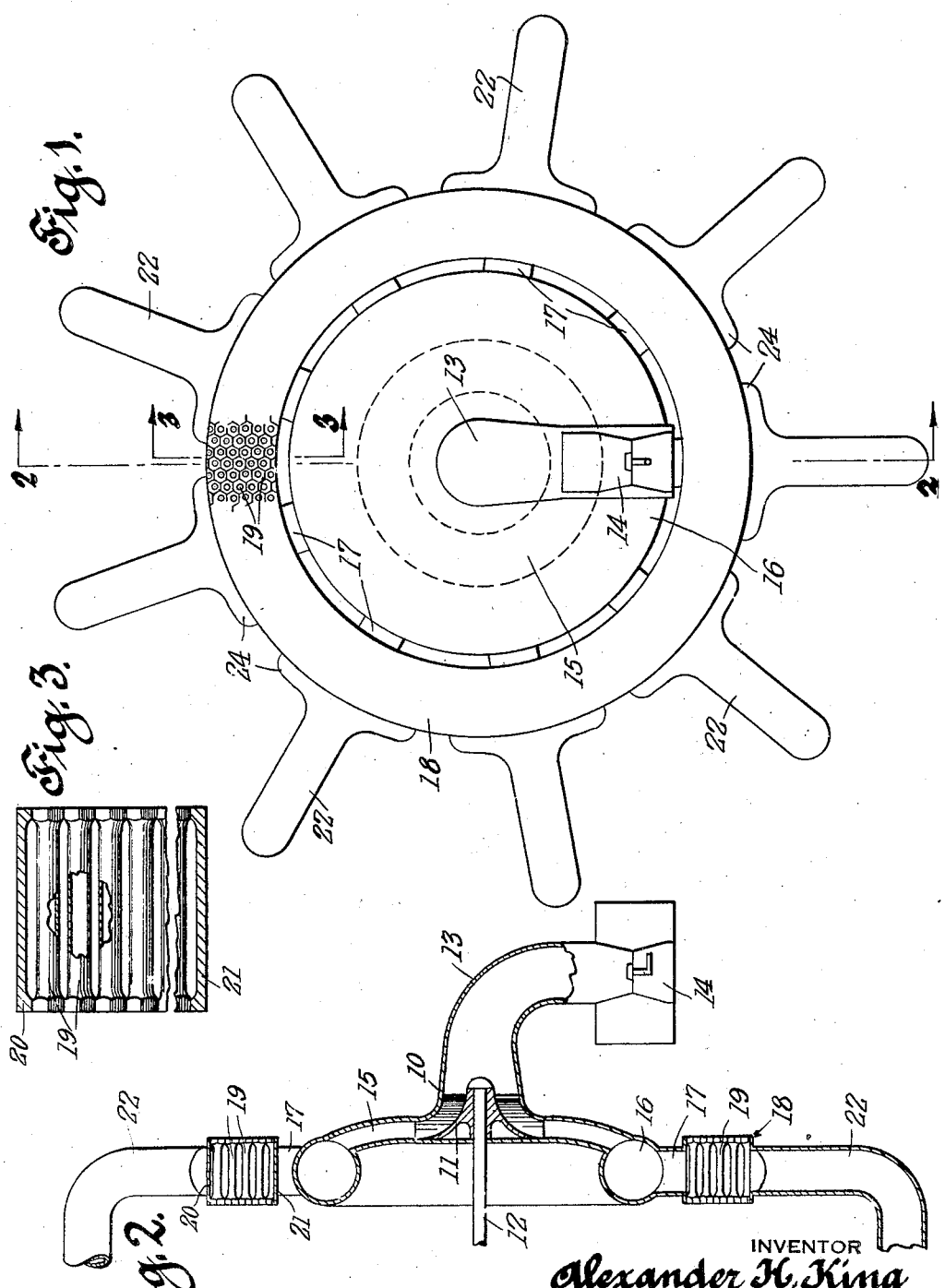

Nov. 14, 1933.  A. H. KING  1,935,186
INTAKE SYSTEM FOR AIRCRAFT ENGINES
Filed July 3, 1930  3 Sheets-Sheet 2
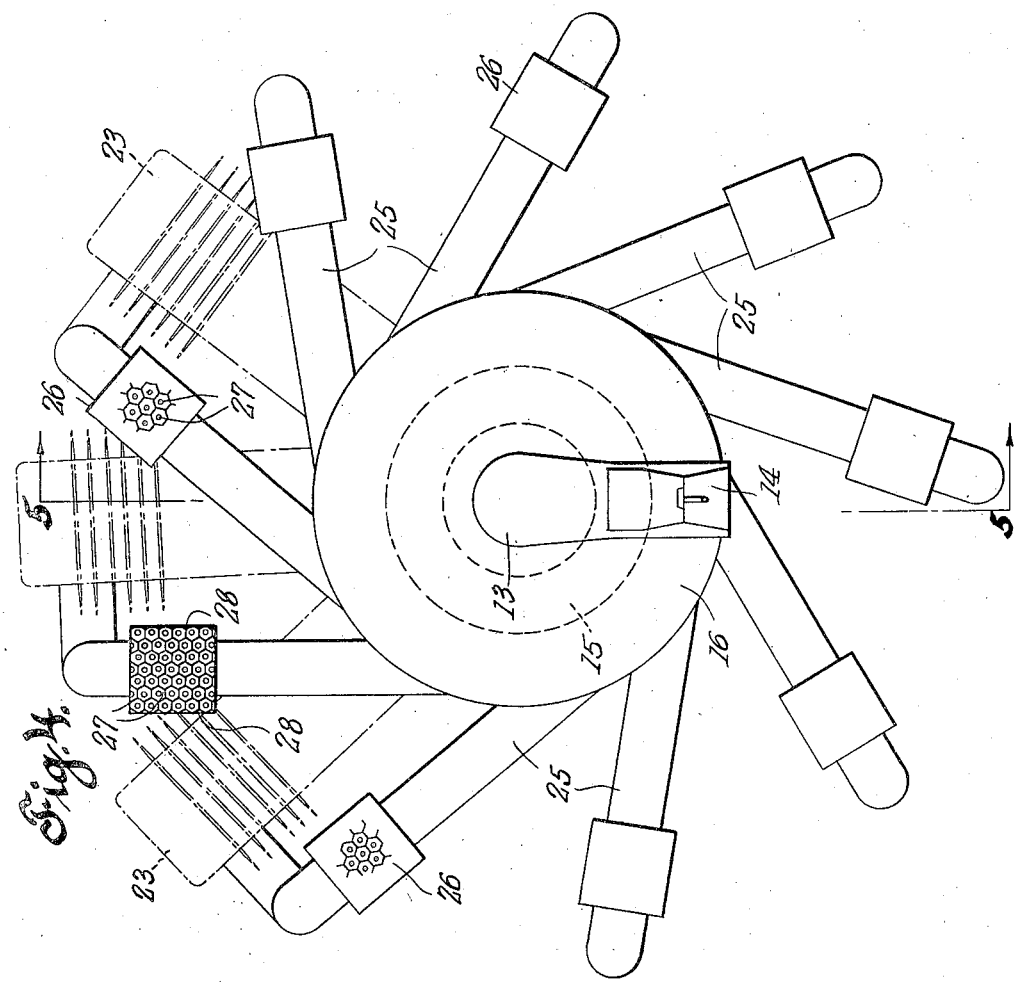
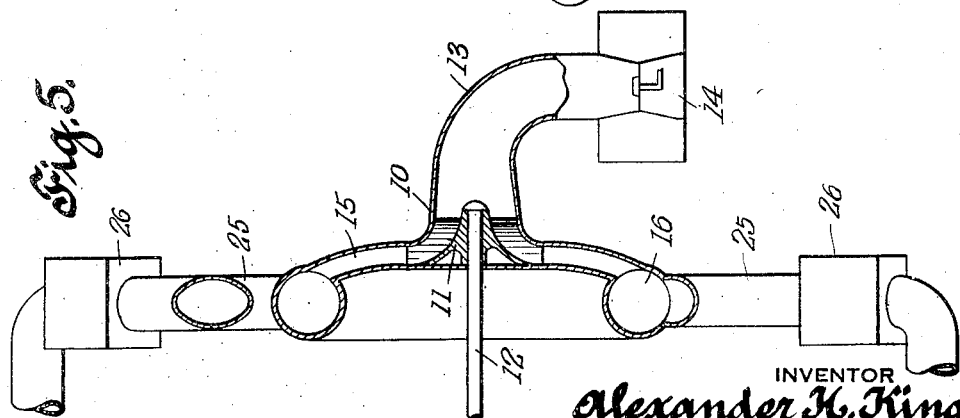
INVENTOR
Alexander H. King
BY
Joseph V. Schofield
ATTORNEY

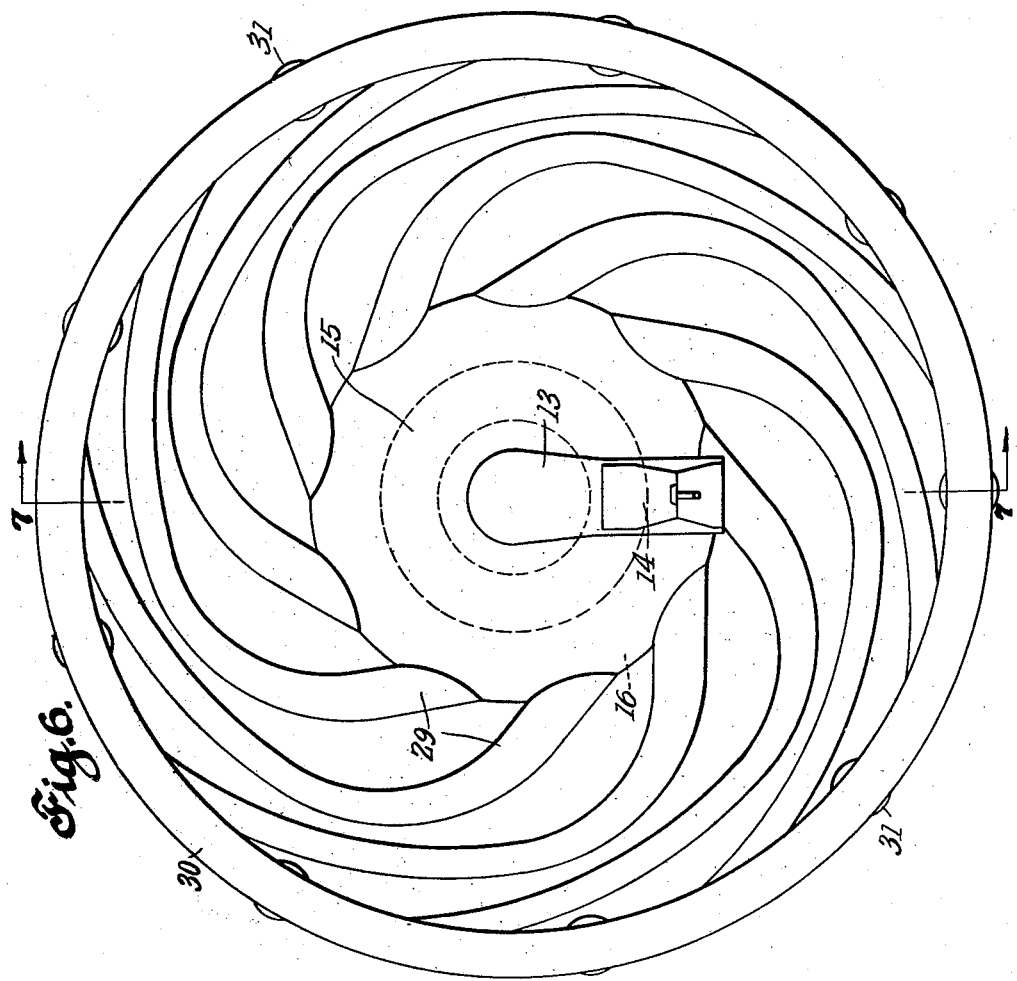
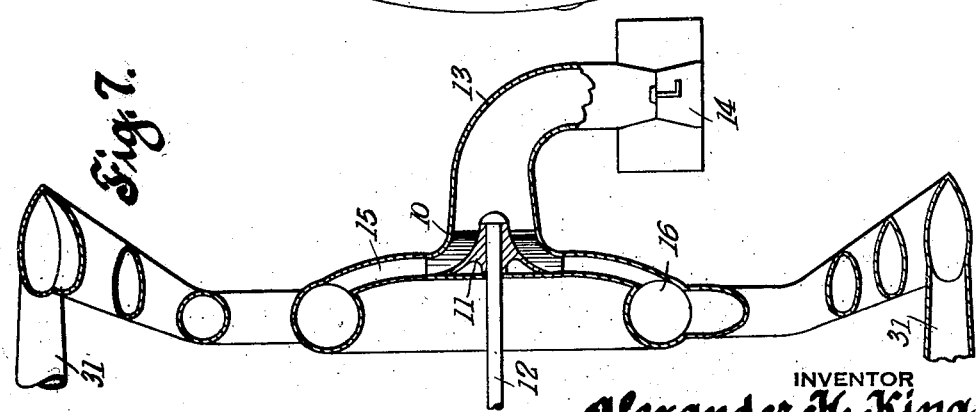

Patented Nov. 14, 1933

1,935,186

UNITED STATES PATENT OFFICE 1,935,186

INTAKE SYSTEM FOR AIRCRAFT ENGINES

Alexander H. King, West Hartford, Conn., assignor to Pratt & Whitney Aircraft Company, East Hartford, Conn., a corporation of Delaware Application July 3, 1930. Serial No. 465,637

10 Claims. (Cl. 123—119)

This invention relates to heat radiators or intercoolers for gaseous mixtures particularly adapted for application to fuel intake systems of aircraft engines.

A primary object of the invention is to provide means to cool the air or explosive fuel mixture during its passage through the intake passage of an aircraft engine and usually after having passed through a supercharger to increase its pressure.

A feature of importance of this invention is that a radiator or intercooler of the air cooled type is interposed between the carburetor or other form of fuel mixing device and the intake passage adjacent and leading into an engine cylinder.

It is now standard practice in connection particularly with aircraft engines of the internal combustion type to provide a supercharger to increase the pressure of the air admitted to an engine either before or after being mixed with the liquid fuel in order to admit a sufficient quantity of the explosive mixture while flying in the rarefied atmosphere of high altitudes. The supercharging effect or pressure increase of the air or of the mixture by this operation is sufficient to materially increase its temperature, thus reducing the amount of mixture that can be admitted through the intake passages and otherwise adversely affecting the engine efficiency. An object, therefore, of the invention is to materially reduce the temperature of the air or mixture occasioned by its compression and after being discharged from the supercharger so that as it enters the engine cylinders its temperature is substantially normal permitting increased amounts to be admitted.

Another object of importance is to provide a heat radiator so arranged that its cooling effect may be obtained by being placed in the stream line of the propeller with which the aeroplane may be fitted, air passing through multiple parallel openings within the radiator to effect this cooling.

A still further object of the invention is to provide improved cooling devices for the explosive charges or for the air before being mixed with the fuel elements admitted to an engine cylinder which may be advantageously applied to an aircraft engine of the radial type between a centrally disposed supercharger and the individual intake passages leading to the angularly disposed engine cylinders.

And finally it is an object of the invention to expose the mixture being cooled within small spaces and in finely subdivided condition to large areas of cooled metal. The mixture being so divided that its cooling will be more complete and, in case of back-firing, the fire will not be carried through the radiator to the impeller discharge passage, but will be extinguished by contact with the cooled metal parts of the radiator.

With the above and other objects in view, my invention includes the features of construction and operation set forth in the following specification and illustrated in the accompanying drawings.

In the accompanying drawings annexed hereto and forming a part of this specification, I have shown my invention embodied in several types of heat radiators or intercoolers for aircraft engines of the radial type adapted to cool the fuel mixture admitted to the cylinder, but it will be understood that the invention can be otherwise embodied and that the drawings are not to be construed as defining or limiting the scope of the invention, the claims appended to this specification being relied upon for that purpose.

In the drawings:

Figure 1 is a front elevation of a fuel intake system showing one form of the mixture cooling radiator associated with a supercharger.

Fig. 2 is a side elevation, partly in section, of the form of radiator shown in Fig. 1.

Fig. 3 is a detail sectional view upon the plane of line 3—3 in Fig. 1 of a fragmentary part of a radiator showing a preferred construction.

Fig. 4 is a front elevation of another embodiment of the invention showing intake radiators in tangentially disposed intake conduits.

Fig. 5 is a side elevation partly in section of the form of radiator shown in Fig. 4.

Fig. 6 is a front elevation of a third embodiment of the invention, and

Fig. 7 is a side elevation in section of the form of the invention shown in Fig. 6.

In the above mentioned drawings I have shown several embodiments of the invention which are now deemed preferable but it is to be understood that changes and modifications may be made within the scope of the appended claims without departing from the spirit of the invention.

Referring more in detail to the figures of the drawings, and first to the form of the invention shown in Figs. 1, 2 and 3, I show a supercharger casing 10 within which is adapted to be rotated at high speed an impeller 11 mounted upon a shaft 12. The intake portion 13 of the supercharger casing 10 is provided with a carburetor 14 of any standard or desired form, the one shown being indicated diagrammatically. The discharge or diffusor passage 15 of the supercharger casing 10 delivers the compressed mixture to an annulus 16 concentric to the casing 10, the form of which is clearly indicated in Figs. 1 and 2. This discharge ring or annular discharge chamber 16 is connected upon the outer portions of its circumference by several passages 17, preferably one being provided for each cylinder of the engine to which the intercooler system may be applied, the opposite or outer ends of these connecting passages 17 connecting with an annular radiator 18, the form being preferably as indicated in Fig. 3. This radiator 18 may be of the multi-tubular type built up of small and thin tubes 19 expanded at their opposite ends into hexagonal forms, the ends being soldered or otherwise secured together at their ends and disposed betwen outer and inner flat rings 20 and 21 to which they are also attached. The connections 17 are connected to the inner ring 21 about openings formed therein. The outer ring 20 of this radiator 18 is pierced by a number of openings about which are secured individual intake pipes 22 leading to the different cylinders 23 of the engine.

It will be noted that the tubes 19 comprising the major portion of the radiator 18 extend in a direction parallel to the axis of the impeller shaft 12, which is in usual practice co-axial with the main shaft and propeller. The flight of the aircraft and engine through the air and the action of the propeller therefore forces air through the tubes 19, thus keeping their metal surfaces at a low temperature. The mixture coming from the discharge passage 16 of the supercharger passes about the outside surfaces of these tubes 19 but within the space within the radiator 18, thus being materially reduced in temperature. As indicated in Figs. 1 and 2, the intake pipes 22 leading from the outer ring 20 of the radiator 18 may be attached to enlarged bosses or projections 24 of considerable width in order that the flow of mixture from the annular radiator 18 to the intake pipes 22 may be drawn more uniformly from the entire circumference of the radiator. It will be understood that in Figs. 1 and 2 the tubes 19 are shown somewhat enlarged relative to the remaining parts of the radiator 18, as the tubes in practice are of such small diameter that they could not be shown upon their true scale and still be indicated as tubes expanded into hexagonal form at their ends.

Referring now to the form of the invention shown in Figs. 4 and 5, it will be seen that an impeller discharge chamber 16, which may be similar to the chamber above described, is provided of annular form connected to the impeller casing proper 10 by a diffusion chamber 15. These parts, as indicated, may be similar to those shown in Figs. 1 and 2. From the discharge chamber 16 of the supercharger extend individual intake conduits 25 adapted to be connected to the individual cylinders of the engine. These conduits 25, as shown in Fig. 4, join the discharge chamber 16 at angularly spaced points and preferably, to increase their length and to dispose them tangentially relatively to the discharge chamber 16, they are disposed a shown in Fig. 4. Within each of these intake conduits 25 is introduced a radiator or intercooler 26, the construction being preferably multi-tubular similar to that indicated in Fig. 3. The tubes 27 in this form of radiator may be enclosed within side walls 28, the inner and outer walls being provided with openings about which are adapted to be connected the sections of the intake conduit 25. The radiators are open at front and in rear so that air may traverse through the group of tubes to effect the cooling in the same manner as in the radiator shown in Figs. 1, 2 and 3. The mixture therefore, after leaving the discharge chamber 16 and entering an individual intake pipe 25, is necessarily forced to traverse about the walls of the cooled tubes 27 formed by the radiator. The radiators are disposed so that their tubes 27 extend in the direction of flight of the aeroplane and are preferably disposed between the cylinders of the engine so that they will be directly in the air stream to obtain a maximum cooling effect.

Referring now to Figs. 6 and 7 of the drawings, a still further embodiment of the invention is illustrated. In this case also the supercharger casing 10 has the usual diffusor chamber 15 and discharge chamber 16 shown in the other figures. Extending from the outer surface of this discharge chamber 16 in directions substantially tangentially therefrom are curved tubes 29, the curves being of spiral form and extending to such an extent that the tubes are materially lengthened. To increase the radiating effect of these tubes 29 they may be flattened or streamlined into elliptical form throughout their intermediate portions as indicated in cross section in Fig. 7. In addition to their area being reduced materially relatively to their outer surfaces, their wind resistance is correspondingly reduced. The outer ends of these curved tubes 29 enter an annulus or collector ring 30 preferably of circular cross section from which extend lateral intake pipes 31 leading to the intakes to the individual engine cylinders. As shown in Fig. 6, these engine intake pipes 31 may be connected to the collector ring 30 at points substantially midway between the points of attachment of the curved tubes 29 to uniformly distribute the flow of the cooled mixture through these portions and to utilize all of the parts of the collector ring 30 with maximum efficiency.

In operation the air entering the opening of the carburetor 14 may be mixed with the liquid fuel entering through a separate conduit and, after being mixed, is admitted to the supercharger casing 10. However, the mixing of the air and fuel may take place subsequent to the passage of the air through the radiator. Within this casing the mixture or air is increased in pressure and enters the diffusor passage 15 from which it passes at its increased pressure to the discharge chamber 16.

Within the discharge chamber 16 the temperature of the fuel mixture or air is at a point materially above normal occasioned by its compression. From the chamber 16 the mixture at high temperature enters the inner portions of the intake conduits indicated in the different embodiments of the invention by reference numerals 17–25 and 29. From these portions of the intake conduits the mixture enters the heat radiating means and while therein the mixture is divided into small subdivisions and while moving through the radiating means is subjected to the air cooled tubes of which the radiators are formed. Upon completing the passage through the heat radiating portions the mixture reduced materially in temperature is admitted to the individual intakes indicated by 22, the outer ends of conduits 25, and intakes 31. From these intakes the mixture enters the cylinders of the engine.

What I claim is:

1. A fuel intake system for aircraft engines comprising in combination, a fuel charge mixing device, a central casing connected to said mixing device, intake conduits radiating from said casing and extending to individual cylinders of said engine, and a common annular heat radiating means joining each of said conduits to cool the air admitted to said cylinders.

2. An intake system for aircraft engines comprising in combination, a supercharger, a discharge chamber therefor, heat radiating means concentric with and surrounding said chamber for cooling air supplied through said supercharger, conduits between said chamber and said radiating means, and individual intake conduits extending from said radiating means to the intakes of the engine cylinders.

3. A fuel intake system for aircraft engines comprising in combination, a fuel mixing device, a supercharger connected thereto, a discharge chamber connected to and surrounding said supercharger, individual intake conduits extending from said chamber to the engine cylinders, and a multi-tubular radiator of annular form connected to said intake conduits and having finely divided spaces through which the fuel mixture is constrained to travel, said spaces being formed by closely adjacent tubes having their inner surfaces cooled by the air through which the engine passes.

4. An intake system for aircraft engines comprising in combination with said engine, a supercharger, a discharge chamber therefor, a plurality of radially disposed cylinders on said engine, an annular heat radiator concentric with said discharge chamber, individual connections between said radiator and said cylinders, and a plurality of connections between said radiator and said chamber.

5. A heat radiating system for the intake of an aircraft engine comprising in combination, a fuel and air mixing device, a supercharger connected thereto, a discharge chamber for said fuel and air surrounding said supercharger, conduits from said chamber to the engine cylinders, said conduits being tangentially disposed relative to said chamber, and individual multi-tubular heat radiating means interposed in each of said conduits, said radiating means being disposed between adjacent cylinders.

6. A heat radiating system for the intake of an aircraft engine comprising in combination, a fuel and air mixing device, a supercharger connected thereto, a discharge chamber for said fuel and air surrounding said supercharger, individual intake conduits from said chamber to the engine, and multi-tubular heat radiating means interposed at intermediate points of said conduits whereby said radiating means may be disposed between adjacent cylinders and in the streamline of said engine.

7. A heat radiating system for the intake of an aircraft engine having radially disposed cylinders comprising in combination, a fuel and air mixing device, a supercharger connected thereto, a discharge chamber for said fuel and air surrounding said supercharger, radially extending conduits from said chamber to the cylinders of said engine, and individual multi-tubular heat radiating means interposed at intermediate points of said conduits and located within the streamline of said engine between adjacent cylinders.

8. A heat radiating system for the intake of an aircraft engine comprising in combination, an air intake, a supercharger therein, a discharge chamber surrounding said supercharger, conduits from said chamber to the engine cylinders, said conduits being tangentially disposed relative to said chamber, and individual multi-tubular heat radiating means interposed in each of said conduits, said radiating means being disposed between adjacent cylinders.

9. A heat radiating system for the intake of an aircraft engine comprising in combination, an air intake, a supercharger therein, a discharge chamber surrounding said supercharger, individual intake conduits from said chamber to the engine, and multi-tubular heat radiating means interposed at intermediate points of said conduits whereby said radiating means may be disposed between adjacent cylinders and in the streamline of said engine.

10. A heat radiating system for the intake of an aircraft engine having radially disposed cylinders comprising in combination, an air intake, a supercharger therein, a discharge chamber surrounding said supercharger, radially extending conduits from said chamber to the cylinders of the engine, and individual multi-tubular heat radiating means interposed at intermediate points of said conduits and located within the streamline of said engine between adjacent cylinders.

ALEXANDER H. KING.